Aug. 9, 1932.  R. C. PARKS ET AL  1,870,585
CUTTING OR MARKING TOOL
Filed March 24, 1928

Inventor:
Ralph C. Parks,
Murray C. Eldredge
By Nissen & Crane
Atty.

Patented Aug. 9, 1932

1,870,585

UNITED STATES PATENT OFFICE

RALPH C. PARKS AND MURRAY C. ELDREDGE, OF CHICAGO, ILLINOIS

CUTTING OR MARKING TOOL

Application filed March 24, 1928. Serial No. 264,351.

Our invention relates in general to cutting or marking tools and has particular reference to an improvement in glass cutters of the hand-manipulated type.

The primary object of our invention is to provide means for renewing the cutter per se when its edge becomes dull or otherwise incapacitated for use.

Another object of the invention is to provide means for accomplishing the renewal of the cutter in a simple and convenient manner.

Still another object is to provide a tool of the class described in which provision may be made for renewing the cutter without appreciably adding to the production cost of the tool.

Other objects of the invention will appear hereinafter, the novel features and combinations being set forth in the appended claims.

In the accompanying drawing:—

Figure 1:
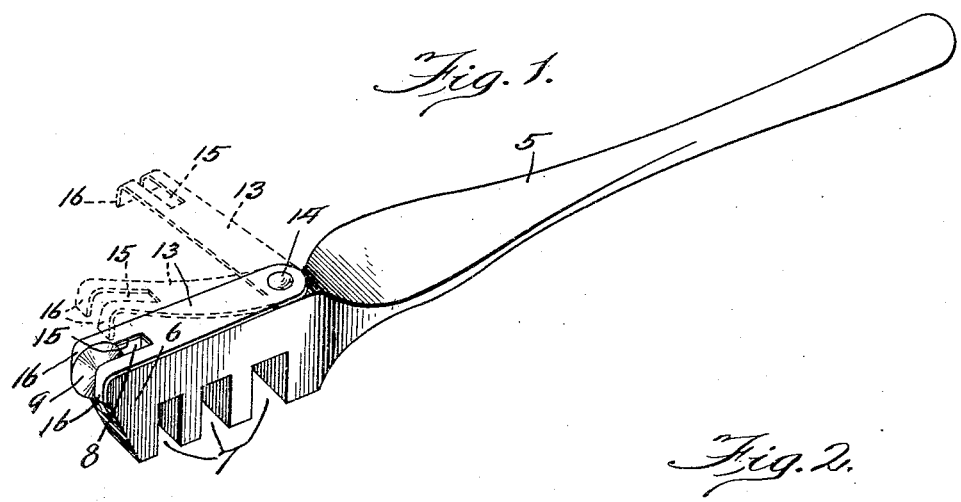
Fig. 1 is a perspective view of a glass cutter illustrating the application of our invention.
Figure 3:
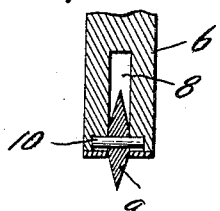
Fig. 3 is a horizontal section through the tool head showing a cutter applied thereto.
Figure 2:
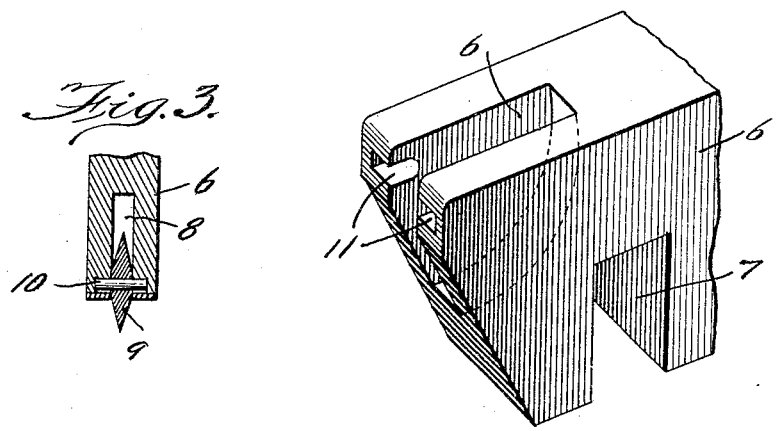
Fig. 2 is an enlarged detail view in perspective of the end of the tool head which accommodates the cutter.
Figure 4:
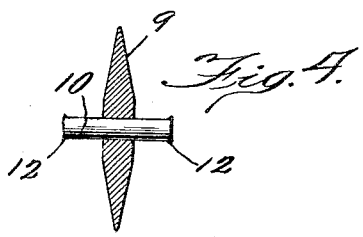
Fig. 4 is a detail view in section of one of the renewable cutters.

Referring now to the drawing in detail, 5 represents the tool handle and 6 the tool head which is preferably formed as an integral part of the handle and generally shaped to conform to the standard construction of glass cutters of this particular type. In this connection, the head is equipped with parallel openings 7 of various dimensions for accommodating various thicknesses of glass which is to be cut by the tool. These openings are used to sever the glass along the line of cut after it has been scored by the cutter. This is, of course, a common expedient and is carried out with glass cutters of this kind.

According to our invention, the end of the tool head 6 is made with a slotted opening 8 open at one end for the reception of the rotary cutter 9. The cutter in this respect being mounted upon a shaft or spindle 10, the ends of which are received by the undercut open ended recesses 11 in the cutter head on opposite sides of the slotted opening 8.

The ends of the shaft or spindle 10 are preferably burred, as at 12, to prevent the cutter 9 from sliding off either end thereof. Attention is invited at this time to the fact that we prefer to mount the cutter 9 with freedom of rotation about the shaft or spindle 10 rather than fixedly thereto which would cause the shaft or spindle 10 to rotate for effecting rotation of the plate. The ends of the shaft or spindle 10, as stated, are inserted in the open ended recesses 11 and the burred ends 12 provide a fit, so to speak, which will prevent the shaft and the cutter from accidentally falling out of the slotted opening 8.

The spindle 10 including the burred ends 12 may make a sufficiently close fit in the recesses 11 to cause friction to hold the spindle 10 stationary while the wheel 9 rotates freely thereon during operation.

To confine the cutter within the slotted opening 8, we prefer to employ a clip 13 pivoting the same as at 14 upon the top of the head so that it will extend to the end of the head, straddling the cutter 9 by reason of the slot 15 and closing the open ends of the recesses 11 by reason of the downwardly turned ends 16 on the clip. As illustrated in full lines in Fig. 1, the cutter 9 is mounted to a tool head and is free to rotate within the slot 8, and the clip 13 will prevent its removal or release.

Should it become necessary or desirable to change the cutter 9 in favor of a new one, the clip 13 may be raised, as illustrated in the first dotted line position in Fig. 1 and then swung about its pivot 14 to the second dotted line position in Fig. 1, which will expose the open ends of the recesses 11, permitting the cutter and the shaft to be removed from the tool head and a new one inserted. Since the clip 13 straddles the cutter, as illustrated in full lines in Fig. 1, it will be desirable to make the same of some spring metal suitable for the purpose so that it may be sprung into its first dotted line position before being swung about its pivot to its second dotted line position.

From the above, it will be readily seen that with our invention, the cutting tool may be supplied with a new cutter whenever occasion demands and that the provisions for renewing the cutter in no way interferes with the operation of the tool nor does it add a prohibitive additional cost in the manufacture of the tool. Therefore, new cutters may be supplied at comparatively small cost while the handle and head may be retained together with the pivoted spring clip 13.

Obviously those skilled in the art may make various changes in the construction and arrangement of parts without departing from the spirit and scope of the invention as defined by the claims hereto appended, and we therefore do not wish to be restricted to the precise construction herein disclosed.

We claim:—

1. A cutting tool comprising a head, a slot at one end of said head, openings at opposite sides of said slot and extending to but one side of said head, a cutting wheel mounted on a pivot and removably mounted in said slot with the pivot therefor extending into said openings, a spring clip mounted on a second side of said head having a portion positioned to be yieldingly urged in a direction to cover that portion of the openings which extend to said first-mentioned side to prevent accidental displacement of said pivot from said openings.

2. A cutting tool comprising a head, a slot therein for the reception of a cutting tool, openings on opposite sides of said slot, a cutting tool mounted on a pivot, said openings being open at one side thereof for the reception of said pivot and having means for preventing axial movement of said pivot, and a spring clip mounted on said head and adapted to hold said pivot in said openings, said spring being yieldingly urged towards said openings and pivot to cover the open sides of said openings.

3. A cutting tool comprising a head, a slot in a face of said head opposed to the work during the normal use of said tool, said head having openings therein communicating with said face and with said slot to permit the insertion of a pivot into said openings, said openings having rigid walls, a pivot arranged within said openings and abutting against said rigid walls of said openings during the normal use of said tool, the working force during the normal intended use of said tool always being in a direction such as to move said pivot into said openings against said rigid walls, and a holding member mounted on a face of said head other than said first face for holding said pivot in said openings and having portions thereof normally extending over said openings and pivot to cover the same and hold said pivot in place in said openings against accidental displacement therefrom, said holding member being mounted for quick movement to an inoperative position by manual pressure applied thereto.

4. A cutting tool comprising a head, a slot in a face of said head opposed to the work during the normal use of said tool, said head having openings therein communicating with said face and with said slot to permit the insertion of a pivot into said openings, said openings having rigid walls, a pivot arranged within said openings and abutting against said rigid walls of said openings during the normal use of said tool, the working force during the normal intended use of said tool always being in a direction such as to move said pivot into said openings against said rigid walls, and a holding member for retaining said pivot in said openings against accidental displacement therefrom mounted on said head elsewhere than on said first mentioned side, and having portions normally extending over said pivot on said first mentioned side of said head to prevent movement of said pivot out of said openings, said holding member being mounted for quick movement to an inoperative position by manual pressure applied thereto.

In testimony whereof we have signed our names to this specification on this 20th day of March, 1928.

RALPH C. PARKS.
MURRAY C. ELDREDGE.